United States Patent [19]
Brutsaert

[11] Patent Number: 6,056,350
[45] Date of Patent: May 2, 2000

[54] VEHICLE WITH A ROLLABLE BUILT-IN SUN-BLIND

[75] Inventor: Louis Marcel Brutsaert, Menen, Belgium

[73] Assignee: Brutsaert Accessories NV, Menen, Belgium

[21] Appl. No.: 08/927,899

[22] Filed: Sep. 11, 1997

[30]     Foreign Application Priority Data

Sep. 11, 1996 [DE] Germany ........................... 196 36 877

[51] Int. Cl.⁷ ....................................................... B60P 3/34

[52] U.S. Cl. ........................... 296/163; 135/88.11; 160/70

[58] Field of Search ........................ 296/163; 135/88.01, 135/88.05, 88.07, 88.1, 88.11; 160/69, 70, 66

[56]     References Cited

U.S. PATENT DOCUMENTS

| 4,355,834 | 10/1982 | Alford | 296/163 |
| 4,474,403 | 10/1984 | Miller | 296/163 X |
| 5,192,111 | 3/1993 | Hanemaayer | 296/163 X |
| 5,365,989 | 11/1994 | Eger et al. | 160/70 X |
| 5,369,919 | 12/1994 | Lobausen | 160/70 X |

FOREIGN PATENT DOCUMENTS 84477  7/1983  European Pat. Off. ............... 296/163

*Primary Examiner*—Joseph D. Pape
*Attorney, Agent, or Firm*—Bacon & Thomas, PLLC

[57]     ABSTRACT

A vehicle with a rollable, built-in sun-blind, provided in a recess. The vehicle has a roof portion, a side wall portion and a transition portion which extends between the roof and side wall portions. The recess for the rollable sun-blind is provided in the transition portion.

9 Claims, 4 Drawing Sheets

VEHICLE WITH A ROLLABLE BUILT-IN SUN-BLIND

BACKGROUND OF THE INVENTION

1. Field of the Invention

The present invention concerns a vehicle such as a camper, a living van or such, with which a rollable sun-blind is used.

2. Description of the Related Art

It is known that vehicles such as campers, living vans and the like are often equipped with sun-blinds. The sun-blinds are either provided on top of the roof of the vehicle, on the side wall of the vehicle, or in a recess or opening which is provided in the side wall of the vehicle. The recess or opening, due to the typical rounding of the edge of the roof, in other words the rounded transition between the roof and the side wall, is provided under the rounded transition, in other words at a particular distance from the roof of said vehicle.

A disadvantage of the building in of such a sun-blind in a camper, living van or such is that the headroom of the interior of the vehicle, at least on the wall where the sun-blind is provided, is significantly reduced. This results in a loss of cupboard space or standing height in the vehicle. Also, the wall in which the sun-blind is built-in is reduced in height; therefore, a door in this wall must be restricted in height.

Another disadvantage of such a built-in sun-blind is that a relatively complex side wall construction of the living van or such is required to form a watertight recess for the sun-blind in the side wall or that special measures need to be taken for watertightness when an opening is provided in the side wall for the sun-blind.

SUMMARY OF THE INVENTION

The present invention aims for a vehicle in which a sun-blind is provided at the highest point of the living van, camper or such, so that the cupboard space or standing height is as large as possible. Another object of the present invention is to provide such a positioning so that the fitting or providing of the recess for the sun-blind can be easily formed during manufacturing and so that the watertightness surrounding the sun-blind is optimal without any extra sealings or such.

To this end, a vehicle with rollable, built-in sun-blind according to the invention has a transition portion between a roof portion and a side wall portion. A preferably watertight recess in which a rollable sun-blind may be provided is disposed in the transition portion.

In order to keep the above-mentioned cupboard space and standing height in the living van, camper or such as large as possible, a rollable, built-in sun-blind according to the invention comprises a case containing buckling arms and a cloth which can be rolled on a shaft. The case has an opening which, when the cloth is rolled up, is closed off by a front cover section fixed at a front edge of the sun-blind cloth. The front cover section is made such that it follows the general form and contour of the vehicle so that such a built-in sun-blind is very aesthetic and does not influence the aerodynamic characteristics of the vehicle in any way.

To this end, use is made according to the invention of a rollable, built-in sun-blind wherein the rolled-up cloth is situated behind the buckling arms in relation to the front cover section.

BRIEF DESCRIPTION OF THE DRAWINGS

In order to better explain the characteristics of the invention, the following preferred embodiment of a vehicle and the built-in sun-blind used therein is described as an example only, without being limitative in any way, with reference to the accompanying drawings, in which.

DETAILED DESCRIPTION OF THE PREFERRED EMBODIMENTS

Figure 1:
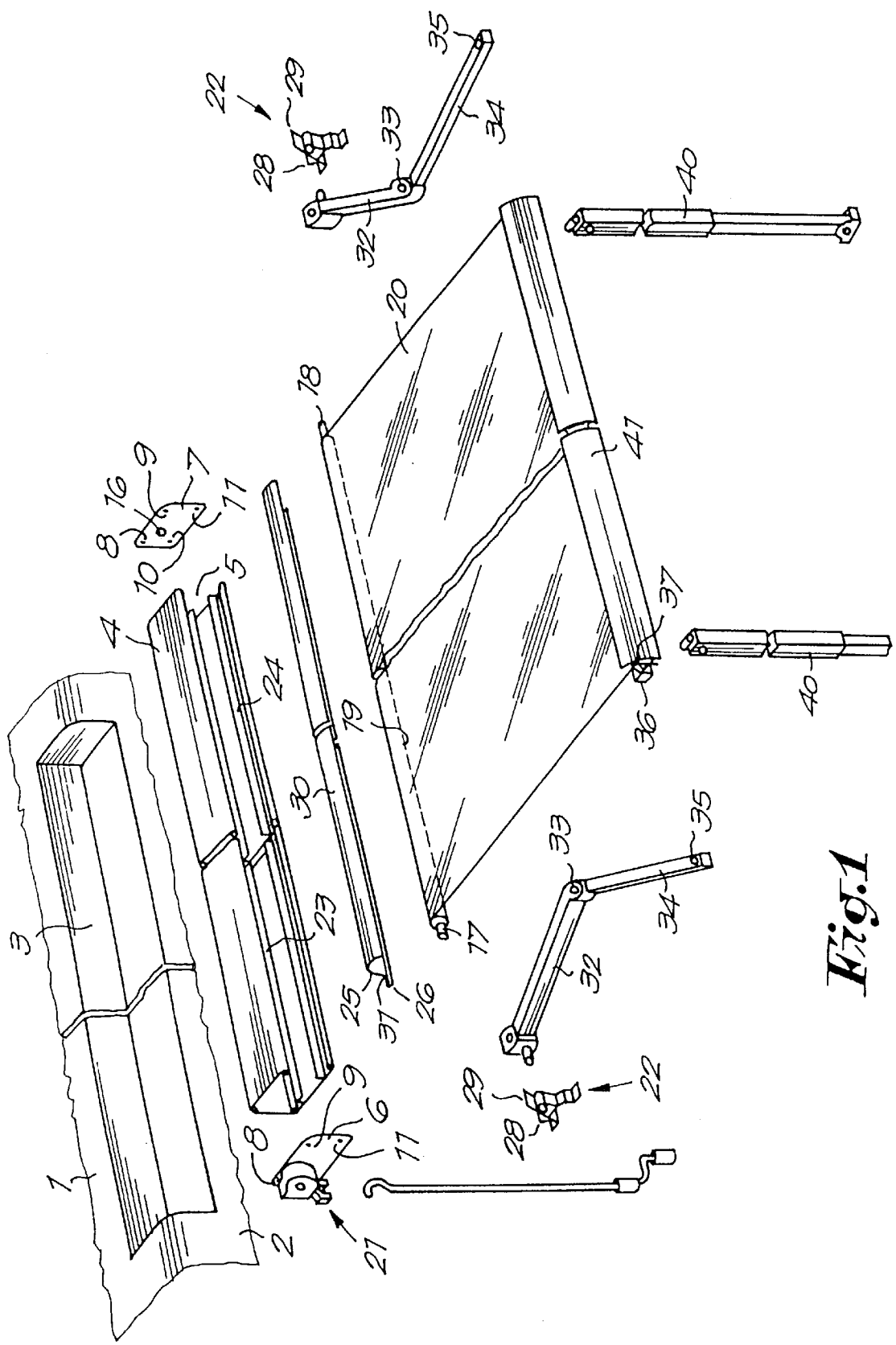
FIG. 1 shows a perspective view of a recess provided in a vehicle for a built-in sun-blind and a disassembled, rollable, built-in sun-blind opposite said recess.
Figure 2:
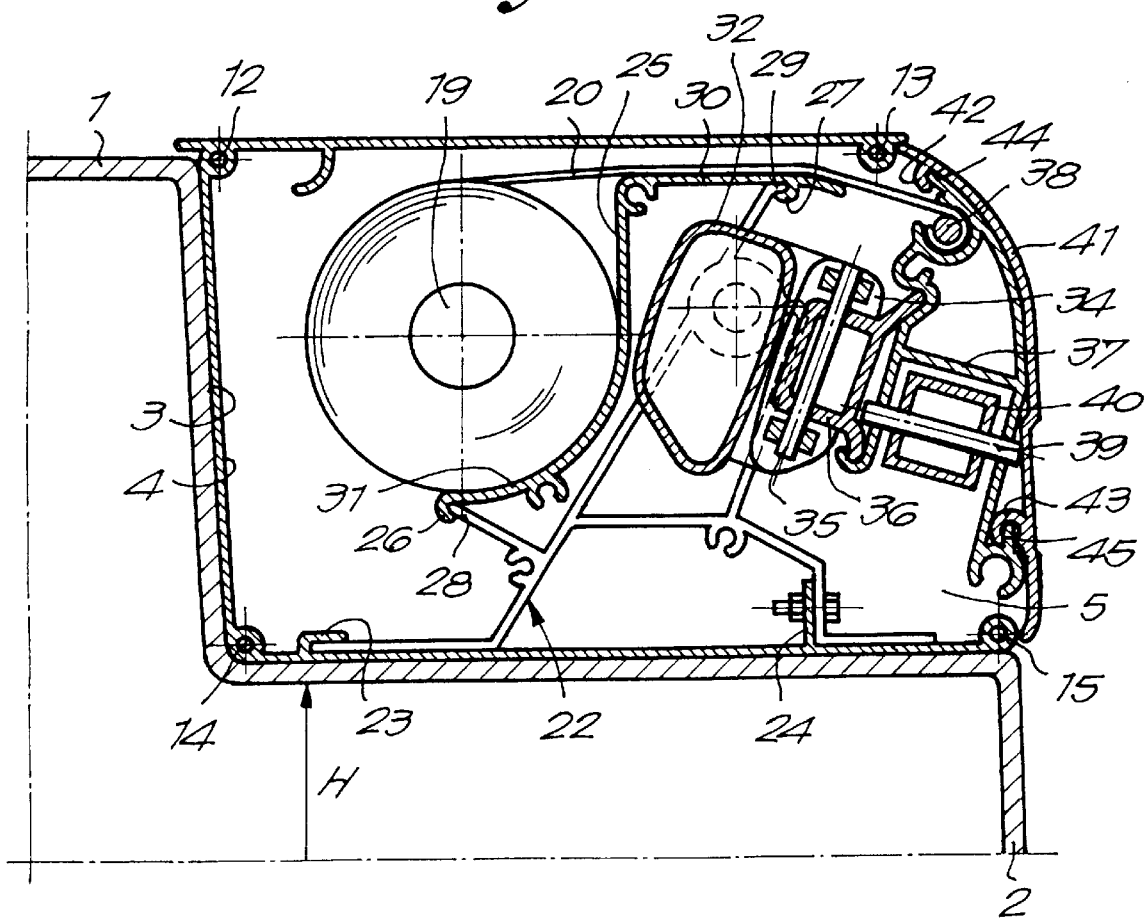
FIG. 2 shows a section of an assembled built-in sun-blind in a rolled-up position.
Figure 3:
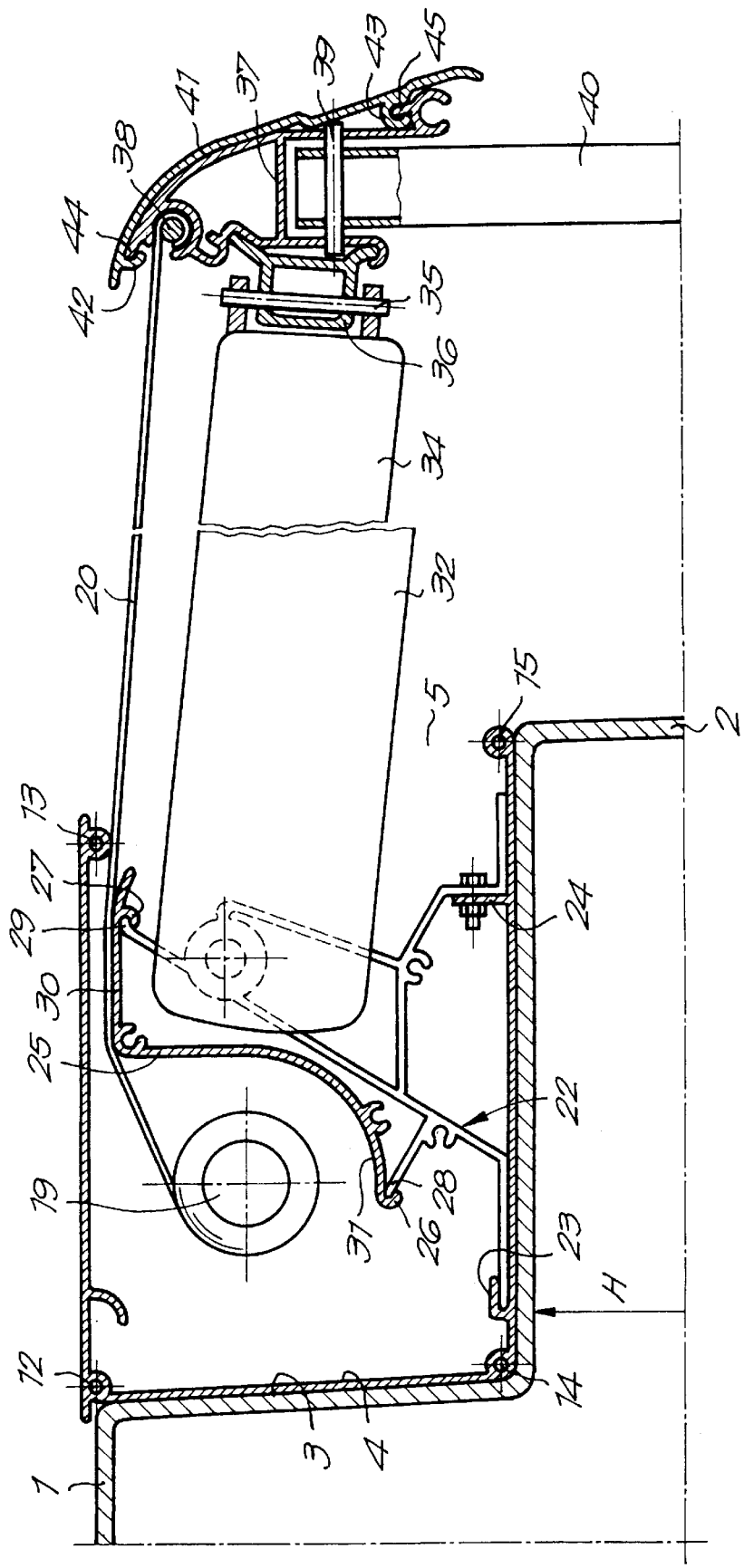
FIG. 3 shows a section analogous to that in FIG. 2, but with the built-in sun-blind rolled out.

As represented in FIG. 1, a recess 3 is provided in a transition portion between a roof portion 1 and a side wall portion 2 of a living van, camper or such, over a length which coincides with the length of the sun-blind to be used.

Recess 3 is provided in a simple manner during the manufacturing of the vehicle and hence it should be watertight over the entire length.

As this recess is provided in the transition portion between roof portion 1 and side wall portion 2, one also maintains a height H under this recess which stays as large as possible. Height H is significantly larger than is the case known until now for vehicles in which built-in sun-blind constructions are used.

The built-in sun-blind, which is used for example in recess 3 of a vehicle, in the embodiment according to FIG. 1 comprises a case 4 which is U-shaped so that an opening 5 is provided at a front. Far ends of U-shaped case 4 are closed off by plates 6–7 which are fixed to the far ends of U-shaped case 4 by screws, not represented in the drawing, which go through screw openings 8–9–10–11 in each plate. These screws cooperate with screw holes 12–13–14–15 provided in U-shaped case 4.

In each plate 6–7, a passage 16 is provided in which a first and a second shaft end 17–18 of a shaft 19 of a cloth 20 may be provided in a freely rotating manner at second shaft end 18 in passage 16 and connected to a driving mechanism 21 at first shaft end 17.

This driving mechanism may consist of a manual mechanism which is either driven by a crank or by an electric motor.

In U-shaped case 4, two or more support members 22 are provided which mesh under a U-shaped edge 23 in U-shaped case 4 and are connected in a suitable manner to a standing rib 24 in U-shaped case 4, for example by means of a screw.

An internal plate section 25 is pushed over support members 22 by bent parts 26–27 which cooperate with flange ends 28 and 29 of support members 22. Internal plate section 25 has a flat portion 30 over which cloth 20 may slide when it is rolled up and unrolled and a curved portion 31 which offers room for rolled-up cloth 20.

Finally, inner buckling arms 32 are connected to support members 22 which are in turn connected to outer buckling arms 34 by an intermediate hinge 33. Outer buckling arms 34 are in turn connected to supporting elements 36 by a distal hinge 35. Supporting elements 36 are fixed to a support section 37 in a suitable manner. By turning a rod 38, the free end of cloth 20 is fixed between rod 38 and support section 37. Telescopic supports 40 may be provided by small pins 39 on support section 37.

Supporting elements 36 can be clamped in support section 37 or they can be fixed to suitable points by additional screws or such.

Finally, a front cover section 41 is provided over support section 37 which is shaped such that when the sun-blind is in rolled-up position, front cover section 41 coincides with or follows the general roof portion contour and side wall portion contour of the vehicle. In this way, very good results are obtained both from an aesthetic and an aerodynamic point of view.

Front cover section 41 is pushed over support section 37 by bent ribs 42 and 43 which work in conjunction with protrusions 44–45 provided on support section 37.

As represented in the drawings, a sun-blind construction is preferably used according to the invention in which shaft 19 and the rolled-up cloth are situated behind buckling arms 32–34 and shaft 19 and buckling arms 32–34 are situated in a practically horizontal plane, so that, as opposed to sun-blind constructions in which the shaft and buckling arms are situated vertically on top of one another, the height of the sun-blind construction and of U-shaped case 4, respectively, is minimal. This further increases the maximum cupboard space or standing height H.

Although U-shaped case 4 in the above-described embodiment is made as a whole, it is clear that a sun-blind case can be made in the same manner of separate sections which are attached in a suitable manner to a bottom of the recess 3 on the one hand and over roof portion 1 on the other hand.

Figure 4:
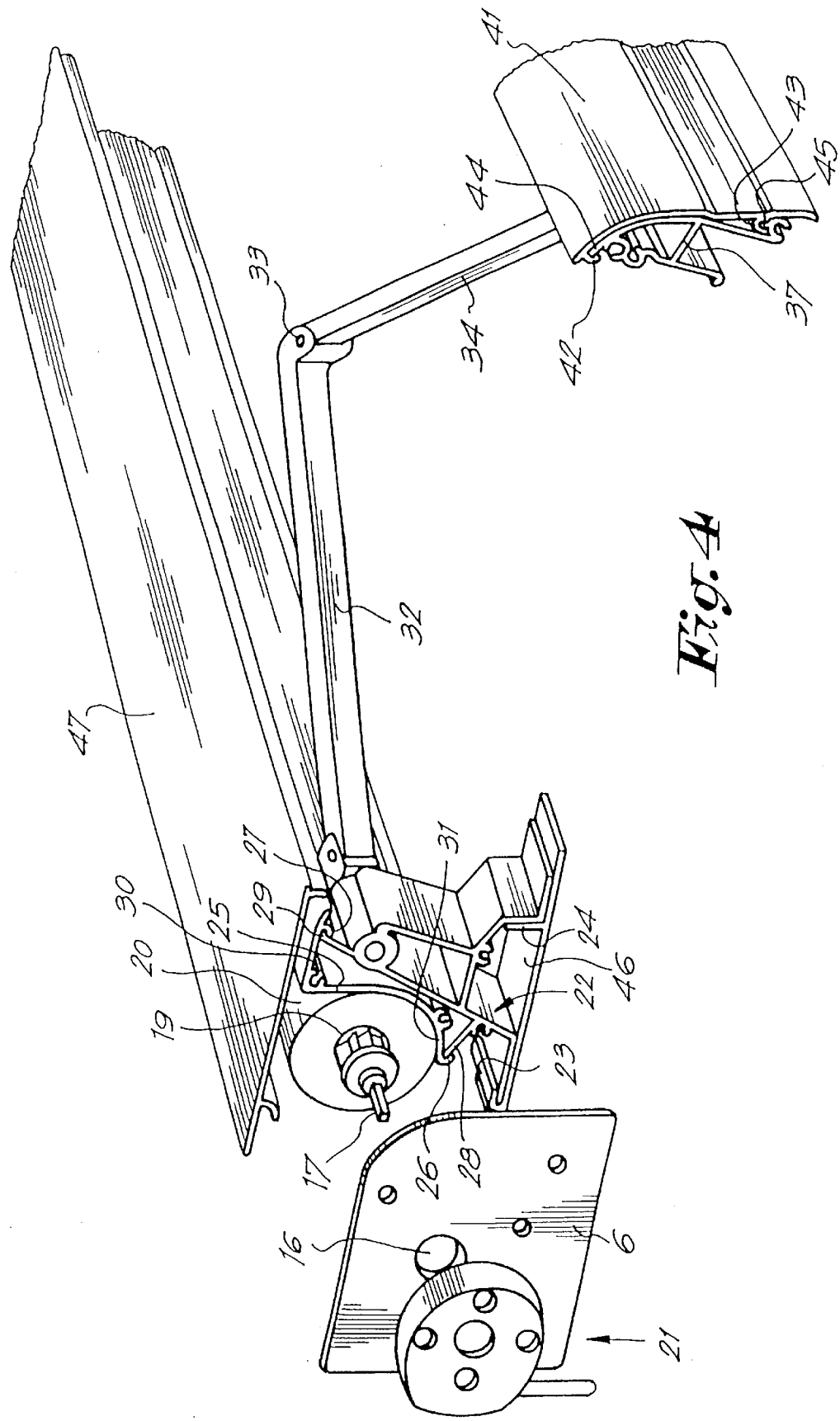
FIG. 4 shows a perspective view of a variant of the sun-blind construction according to FIG. 1.

Such an embodiment is represented, for example, in FIG. 4. A base plate 46 is provided on the bottom of recess 3 onto which support members 22 are fixed in a suitable manner. Further, the sun-blind construction differs from that according to FIG. 1 in that plates 6–7 are fixed to support members 22 and simultaneously to internal plate section 25 by suitable screws, and in that the sun-blind construction is closed off at the top by a top plate 47.

Both base plate 46 and top plate 47 are fixed to the vehicle in this case by gluing, screwing or such.

It is clear that recess 3 can be easily provided during the manufacturing of the vehicle in this manner; that this recess is made watertight in a very simple manner; and that the sun-blind construction does not impair the aesthetic look or the aerodynamic characteristics of the vehicle in any way.

Finally, U-shaped case 4 can be fixed in recess 3 in any way whatsoever. In other words, U-shaped case 4 may be fixed in a watertight manner in recess 3 by screws or such, or may be easily glued in recess 3.

The present invention is by no means limited to the above-described embodiments as represented in the accompanying drawings; on the contrary, such a recess 3 and sun-blind construction 4 to 45 can be made in all forms and dimensions while still remaining within the scope of the invention.

What is claimed is:

1. A vehicle with a rollable, built-in sun-blind, comprising:
   a roof portion;
   a sidewall portion;
   a transition portion extending between said roof portion and said sidewall portion;
   a recess provided in said transition portion;
   a sideways U-shaped case defining a top portion, a rear side portion and a bottom portion and having a height and a width such that said height is significantly smaller than said width;
   a rollable sun-blind mounted in said sideways U-shaped case; and
   a front cover section which closes off said U-shaped case when said sun-blind is rolled up.

2. The vehicle according to claim 1, wherein said U-shaped case, said recess and sun-blind are of approximately the same length.

3. The vehicle according to claim 1, wherein said transition portion formed by said recess is watertight.

4. The vehicle according to claim 1, further comprising:
   a shaft carrying said sun-blind rotatably mounted within said U-shaped case; and
   wherein said sun-blind includes a rectangular cloth having a front edge, a rear edge and two side edges, and a pair of folding buckling arms disposed generally parallel to said side edges in their unfolded positions, said rear edge being fixed to said shaft and said front edge being fixed to said front cover section, said shaft being located behind said buckling arms in relation to said front cover section when said sun-blind is rolled up and said buckling arms are folded.

5. The vehicle according to claim 4, wherein said shaft and said buckling and folding arms when folded are in a substantially single plane.

6. The vehicle according to claim 4, wherein said front cover section is shaped such that it coincides with said transition portion when said sun-blind is rolled up.

7. The vehicle according to claim 4, wherein said top portion of said U-shaped case is co-planar with said roof portion.

8. The vehicle according to claim 4, wherein said U-shaped case is fixed within said recess by screws.

9. The vehicle according to claim 4, wherein said U-shaped case is fixed within said recess by adhesive.

* * * * *